(12) United States Patent
Nakahira et al.

(10) Patent No.: US 10,746,080 B2
(45) Date of Patent: Aug. 18, 2020

(54) EXHAUST SYSTEM DEVICE FOR VEHICLE

(71) Applicant: MAZDA MOTOR CORPORATION, Hiroshima (JP)

(72) Inventors: Takeshi Nakahira, Hiroshima (JP); Yuji Kojima, Horishima (JP); Amane Tsuda, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/088,395

(22) PCT Filed: Jul. 27, 2017

(86) PCT No.: PCT/JP2017/027265
§ 371 (c)(1),
(2) Date: Sep. 25, 2018

(87) PCT Pub. No.: WO2018/021481
PCT Pub. Date: Feb. 1, 2018

(65) Prior Publication Data
US 2020/0025158 A1 Jan. 23, 2020

(30) Foreign Application Priority Data

Jul. 27, 2016 (JP) .................................. 2016-147106

(51) Int. Cl.
*F02M 25/06* (2016.01)
*F01N 13/10* (2010.01)
(Continued)

(52) U.S. Cl.
CPC ................ *F01N 13/10* (2013.01); *B60K 5/04* (2013.01); *B60K 13/04* (2013.01); *B62D 25/14* (2013.01);
(Continued)

(58) Field of Classification Search
CPC ........ F02M 26/15; F02M 26/06; F02M 26/24; F02M 26/27; F02M 26/28; F02M 26/50; B60K 13/04; F01N 3/10; F01N 13/08
See application file for complete search history.

(56) References Cited

U.S. PATENT DOCUMENTS 7,426,921 B2 * 9/2008 Billings .................. F02B 33/38
123/559.1
2003/0131594 A1 7/2003 Kawamizu
(Continued)

FOREIGN PATENT DOCUMENTS

EP 1422412 A2 5/2004
FR 2886671 A1 * 12/2006 ............. F02M 26/15
(Continued)

OTHER PUBLICATIONS

JP-2015021440, Machine Translated on Dec. 10, 2019.*
(Continued)

*Primary Examiner* — Jason D Shanske
(74) *Attorney, Agent, or Firm* — Studebaker & Brackett PC

(57) ABSTRACT

An exhaust system device (1) for a vehicle (100) comprises an exhaust purification device (18) and a first exhaust gas recirculation (EGR) cooler (24). The exhaust purification device (18) is disposed with a central axis of a downstream-side end inclined downwardly toward a rear side of the vehicle (100). The EGR cooler (24) is provided so as to introduce exhaust from a downstream side of the exhaust purification device (18), is adjacent to the exhaust purification device (18) and fixed to the exhaust purification device (18), and is disposed such that a central axis of the EGR cooler (24) is inclined downwardly toward the rear side of the vehicle.

15 Claims, 7 Drawing Sheets

(51) Int. Cl.

| | | |
|---|---|---|
| *F02M 26/06* | (2016.01) | |
| *F02M 26/12* | (2016.01) | |
| *F02M 26/15* | (2016.01) | |
| *F02M 26/24* | (2016.01) | |
| *F02M 26/28* | (2016.01) | |
| *B60K 5/04* | (2006.01) | |
| *B60K 13/04* | (2006.01) | |
| *B62D 25/14* | (2006.01) | |
| *B62D 25/20* | (2006.01) | |
| *F01N 3/10* | (2006.01) | |
| *F02M 26/21* | (2016.01) | |
| *F02M 26/27* | (2016.01) | |
| *F02M 26/50* | (2016.01) | |
| *F01N 13/08* | (2010.01) | |

(52) U.S. Cl.
CPC ........... *B62D 25/2009* (2013.01); *F01N 3/10* (2013.01); *F01N 13/08* (2013.01); *F02M 26/06* (2016.02); *F02M 26/12* (2016.02); *F02M 26/15* (2016.02); *F02M 26/21* (2016.02); *F02M 26/24* (2016.02); *F02M 26/27* (2016.02); *F02M 26/28* (2016.02); *F02M 26/50* (2016.02); *B60Y 2306/01* (2013.01)

(56) References Cited

U.S. PATENT DOCUMENTS

| | | | |
|---|---|---|---|
| 2004/0007411 | A1 | 1/2004 | Arai et al. |
| 2007/0107704 | A1 | 5/2007 | Billings et al. |
| 2008/0251306 | A1 | 10/2008 | Kobayashi et al. |
| 2010/0242901 | A1 | 9/2010 | Seto et al. |
| 2011/0210125 | A1* | 9/2011 | Kardos .................. F01P 11/029 220/502 |
| 2013/0125544 | A1 | 5/2013 | Mond et al. |
| 2014/0318511 | A1 | 10/2014 | Sekiya et al. |

FOREIGN PATENT DOCUMENTS

| | | | | |
|---|---|---|---|---|
| FR | 2886671 | A1 | 12/2006 | |
| FR | 2944061 | A1 | 10/2010 | |
| FR | 2949140 | A1 | 2/2011 | |
| JP | H05-280359 | A | 10/1993 | |
| JP | 2003206783 | A | 7/2003 | |
| JP | 2004044668 | A | 2/2004 | |
| JP | 2004-176554 | A | 6/2004 | |
| JP | 2004-176688 | A | 6/2004 | |
| JP | 2004176554 | A * | 6/2004 | ............. F02M 26/12 |
| JP | 2007-146681 | A | 6/2007 | |
| JP | 2007-315174 | A | 12/2007 | |
| JP | 2008-180173 | A | 8/2008 | |
| JP | 2008-260472 | A | 10/2008 | |
| JP | 2011-214450 | A | 10/2011 | |
| JP | 2012-031782 | A | 2/2012 | |
| JP | 2012-057519 | A | 3/2012 | |
| JP | 2013-241849 | A | 12/2013 | |
| JP | 2015021439 | A * | 2/2015 | |
| JP | 2015021440 | A * | 2/2015 | |
| JP | 2015021441 | A * | 2/2015 | |
| JP | 2015-059559 | A | 3/2015 | |
| JP | 2015-124692 | A | 7/2015 | |
| JP | 2015-218588 | A | 12/2015 | |
| JP | 2016-003614 | A | 1/2016 | |

OTHER PUBLICATIONS

JP-2004176554, Machine Translated on Dec. 10, 2019.*
Extended European Search Report issued by the European Patent Office dated Feb. 22, 2019, which corresponds to EP17834483.4-1004 and is related to U.S. Appl. No. 16/088,395.
An Office Action mailed by the Japanese Patent Office dated Nov. 11, 2019, which corresponds to Japanese Patent Application No. 2018-530393 and is related to U.S. Appl. No. 16/088,395.
International Search Report issued in PCT/JP2017/027265; dated Oct. 10, 2017.
An Office Action mailed by the Japanese Patent Office dated Sep. 17, 2019, which corresponds to Japanese Patent Application No. 2018-530392 and is related to U.S. Appl. No. 16/088,395.
Written Opinion of the International Searching Authority issued in PCT/JP2017/027265; dated Oct. 10, 2017.
An Office Action; "Notice of Reasons for Refusal," issued by the Japanese Patent Office dated Jul. 1, 2019, which rresponds to Japanese Patent Application No. 2018-530393 and is related to U.S. Appl. No. 16/088,395; with English language translation.
Communication pursuant to Article 94(3) EPC issued by the European Patent Office dated Jan. 28, 2020, which corresponds to European Patent Application No. 17 834 485.9-1004 and is related to U.S. Appl. No. 16/088,395.
An Office Action mailed by the Japanese Patent Office dated Apr. 6, 2020, which corresponds to Japanese Patent Application No. 2018-530392 and is related to U.S. Appl. No. 16/088,395; with English language ranslation.

* cited by examiner

EXHAUST SYSTEM DEVICE FOR VEHICLE

TECHNICAL FIELD

The present invention relates to an exhaust system device for a vehicle, and more specifically relates to an exhaust system device for a vehicle including an exhaust system device for the vehicle and an exhaust gas recirculation (EGR) cooler disposed downstream thereof.

BACKGROUND ART

Conventionally, in an engine of a compression ignition type such as a homogeneous charge compression ignition (HCCI) type, controlling a burning temperature in a furnace has been important especially during an operation in a high-load range. Hence in the case of adopting an EGR system, in order to be able to control a temperature of an exhaust gas (EGR gas), which is returned to the furnace, in a wider range in the EGR system, it has been desired to improve the cooling performance of the EGR gas.

As one method for providing the furnace with the EGR gas at a lower temperature, for example as described in Patent Document 1, there is an exhaust system device in which the EGR gas is taken out of the downstream side of the exhaust purification device and is then cooled with the EGR cooler and returned to the furnace. In this exhaust system device, the exhaust gas, which is in a rather cooled state by having passed through the exhaust purification device, can be taken out as the EGR gas, so that the EGR gas at a relatively low temperature can be returned to the furnace without the need to significantly enhance the cooling capability of the EGR cooler.

CITATION LIST

Patent Document

Patent Document 1: Japanese Patent Laid-Open No. 2012-57519

SUMMARY OF INVENTION

Technical Problem

In the exhaust system device described in Patent Document 1 above, the exhaust purification device and a turbo supercharger are disposed on the vehicle rear side of the engine, and the EGR cooler is disposed downstream of the exhaust purification device and upstream of a compressor of the turbo supercharger. A pipe connected to an exhaust outlet for an exhaust gas in the exhaust purification device extends to the right side of the exhaust purification device as viewed from the rear side of the engine, and enters between the exhaust purification device and the engine, namely in the front of the exhaust purification device and the rear of the engine, where the pipe is connected to the EGR cooler. The EGR cooler is disposed in a position between the exhaust purification device and the engine, and is fixed to an engine block. The pipe connected to the outlet side of the EGR cooler extends to the left side as viewed from the rear side of the engine along the rear surface of the engine block, and is connected to the turbo supercharger on the left side of the rear surface of the engine.

In the exhaust system device as described in above Patent Document 1, the EGR cooler needs to be disposed between the exhaust purification device and the engine due to the need for the EGR cooler to be fixed to the engine block, and for this reason, the pipe from the exhaust purification device to the EGR cooler is disposed meandering in the longitudinal and horizontal directions of the engine. As thus described, the limitation on the placement of the pipe due to the limitation of placement of the EGR cooler causes the pipe from the exhaust purification device to the turbo supercharger to be long, which sacrifices the response of the EGR system.

The present invention is to provide an exhaust system device for a vehicle which is capable of enhancing the flexibility of placement of the EGR cooler.

Solution to Problem

For achieving the above object, an exhaust system device for a vehicle of the present invention is an exhaust system device for a vehicle including: an exhaust purification device; and an exhaust gas recirculation (EGR) cooler, wherein the exhaust purification device is disposed with a central axis of a downstream-side end inclined downwardly toward a rear side of the vehicle, and the EGR cooler is provided so as to introduce exhaust from a downstream side of the exhaust purification device, is fixed to the exhaust purification device adjacent thereto, and is disposed such that a central axis of the EGR cooler is inclined downwardly toward the rear side of the vehicle.

In the present invention as thus configured, with the EGR cooler being adjacent to the exhaust purification device and fixed to the exhaust purification device, there is no need to fix the EGR cooler to the engine block, and therefore, the EGR cooler can also be disposed in a position apart from the engine block. This enhances the flexibility of placement of the EGR cooler, thus enabling placement of a shorter pipe for the purpose of improvement in response. Since the EGR cooler is adjacent to the exhaust purification device and fixed to the exhaust purification device, the EGR cooler and the exhaust purification device operate as one rigid body, so that generation of vibration and resonance can be suppressed. Further, since the EGR cooler is provided so as to introduce exhaust from the downstream side of the exhaust purification device, the exhaust with a deposit component reduced by the exhaust purification device can be introduced into the EGR cooler. Moreover, the exhaust purification device is disposed with the central axis of the downstream-side end inclined downwardly toward the rear side of the vehicle, and the EGR cooler is disposed such that the central axis of the EGR cooler is inclined downwardly toward the rear side of the vehicle, therefore, accumulation of condensed water, which may be generated in the EGR cooler, in the EGR cooler and the counter flow thereof to the exhaust purification device can be avoided, and the condensed water is smoothly discharged to the exhaust passage.

In the present invention, it is preferable that the EGR gas leading part for taking an EGR gas out of the exhaust purification device be disposed along a gas flow direction of a downstream-side end of the exhaust purification device.

In the present invention as thus configured, since the EGR gas leading part is disposed along the gas flow direction at the downstream-side end of the exhaust purification device, the exhaust gas from the exhaust purification device flows into the EGR gas leading part along the gas flow direction, and hence the exhaust gas from the exhaust purification device can be easily taken out as the EGR gas. Hence an exhaust gas at a desired flow rate is easily ensured in a low-revolution low-load range of the engine in which the flow rate of the exhaust gas is particularly low.

In the present invention, it is preferable that an EGR gas inlet of the EGR cooler be disposed below an EGR gas outlet in a vertical direction of the vehicle, and the EGR gas inlet be disposed above an exhaust outlet of the exhaust purification device in the vertical direction of the vehicle.

In the present invention as thus configured, since the EGR gas inlet of the EGR cooler is disposed below the EGR gas outlet in the vertical direction of the vehicle, when condensed water is generated in the EGR cooler, the condensed water moves to the EGR gas inlet side. Although the EGR gas inlet is connected to the exhaust purification device, the EGR gas inlet is disposed above the exhaust outlet of the exhaust purification device in the vertical direction of the vehicle in the present invention, therefore, the condensed water moved to the EGR gas inlet can be discharged from the exhaust outlet of the exhaust purification device. This prevents suction of the condensed water to the engine side and prevents corrosion of the EGR cooler and the gas passage connected to the EGR cooler.

In the present invention, it is preferable that with respect to an engine having an intake passage provided on a side opposite to a side on which the exhaust purification device is provided, the EGR cooler be adjacent to the exhaust purification device on one side in the vehicle-width direction, and a pipe connecting the EGR cooler and the intake passage extends along a side surface of the engine on the one side in the vehicle-width direction, and be connected to the intake passage on the one side in the vehicle-width direction and on the side opposite to the side where the exhaust purification device of the engine is provided.

According to the present invention with such a configuration, the EGR cooler is adjacent to the exhaust purification device on the one side in the vehicle-width direction, the pipe connecting the EGR cooler and the intake passage extends along the side surface of the engine on the one side in the vehicle-width direction, and the pipe is connected to the intake passage on the one side in the vehicle-width direction and on the side opposite to the side where the exhaust purification device of the engine is provided, whereby the EGR gas path from the exhaust purification device to the intake passage through the EGR cooler can be made short and the response of the EGR control is made favorable.

In the present invention, it is preferable that a turbo supercharger is provided on a side where the exhaust purification device is provided, and with respect to an engine having a compressor downstream passage provided downstream of the turbo supercharger and on one side of the turbo supercharger in the vehicle-width direction, the EGR cooler is adjacent to the exhaust purification device on the one side in the vehicle-width direction, and a pipe connecting the EGR cooler and the compressor downstream passage is connected to the compressor downstream passage on a side of the engine where the exhaust purification device is provided and on the one side in the vehicle-width direction.

According to the present invention as thus configured, the EGR cooler is adjacent to the exhaust purification device on the one side in the vehicle-width direction, and the pipe connecting the EGR cooler and the compressor downstream passage is connected to the compressor downstream passage on the side of the engine where the exhaust purification device is provided and on the one side in the vehicle-width direction, therefore, also in the engine system including the turbo supercharger, the EGR gas path from the exhaust purification device to the compressor downstream passage through the EGR cooler can be made short and the response of the EGR control is made favorable.

In the present invention, it is preferable that the exhaust purification device is disposed on a vehicle rear side of the engine, and at least vehicle rear side ends of the exhaust purification device and the EGR cooler are disposed so as to overlap a floor tunnel region of a dash panel that partitions an engine room and a vehicle interior space as viewed from below and the side of the vehicle.

In the present invention as thus configured, since at least the vehicle rear side ends of the exhaust purification device and the EGR cooler are disposed so as to overlap the floor tunnel region as viewed from below and the side of the vehicle, when the engine, the exhaust purification device, and the EGR cooler move rearward at the time of collision of the vehicle, the exhaust purification device and the EGR cooler are accommodated into the floor tunnel region. Therefore, at the time of collision of the vehicle, the collision of the exhaust purification device and the EGR cooler with the dash panel is prevented to ensure the safety of vehicle passengers and damage on the exhaust purification device and the EGR cooler is also prevented.

In the present invention, it is preferable that a second EGR cooler is disposed downstream of the EGR cooler.

In the present invention as thus configured, since the second EGR cooler is disposed downstream of the EGR cooler, the EGR gas can be efficiently cooled without increasing the sizes of the EGR cooler and the second EGR cooler. Further, the EGR cooler is reduced in size, thereby preventing resonance between the EGR cooler and the exhaust purification device fitted with the EGR cooler.

In the present invention, it is preferable that at least part of a pipe coupling the EGR cooler and the second EGR cooler is made of a rubber hose.

In the present invention as thus configured, since at least part of the pipe coupling the EGR cooler and the second EGR cooler is made of the rubber hose, the rubber hose absorbs vibrations of the EGR cooler and the second EGR cooler. This prevents the resonance between the EGR cooler and the second EGR cooler.

In the present invention, it is preferable that the EGR cooler is of an air-cooling type and the second EGR cooler is of a water-cooling type.

In the present invention as thus configured, since the EGR cooler is of the air-cooling type and the second EGR cooler is of the water-cooling type, it is possible to roughly cool the EGR gas without increasing the size of the EGR cooler and to reliably cool the EGR gas by the second EGR cooler.

DESCRIPTION OF EMBODIMENTS

Hereinafter, preferred embodiments of the present invention will be described below with reference to the accompanying drawings. In a second embodiment and thereafter, similar constituents to in the first embodiment are provided with the same numerals as in the first embodiment and the description thereof will be simplified or omitted.

First Embodiment

Figure 1:
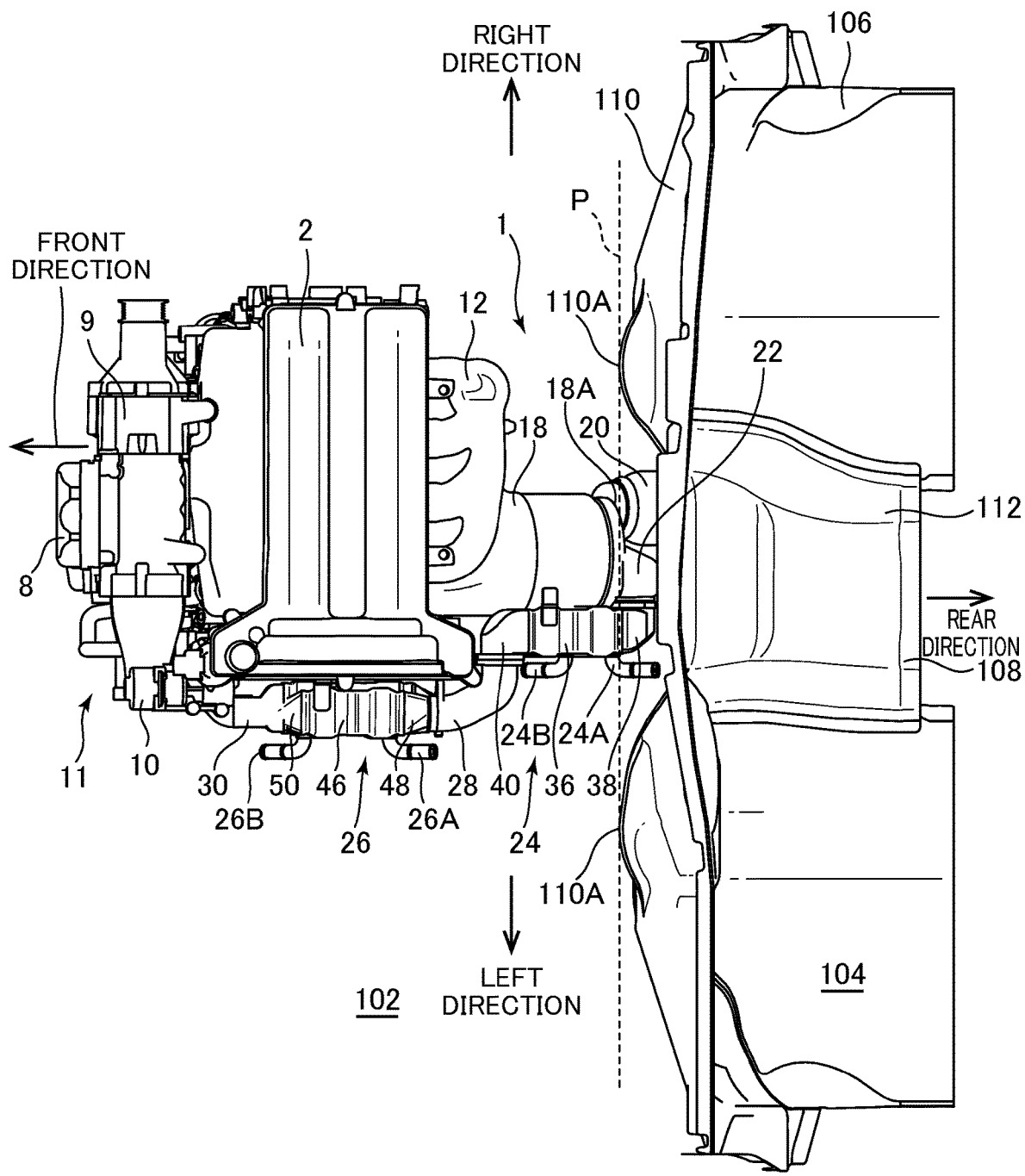
FIG. 1 is a plan view of an exhaust system device for a vehicle according to a first embodiment of the present invention.
Figure 2:
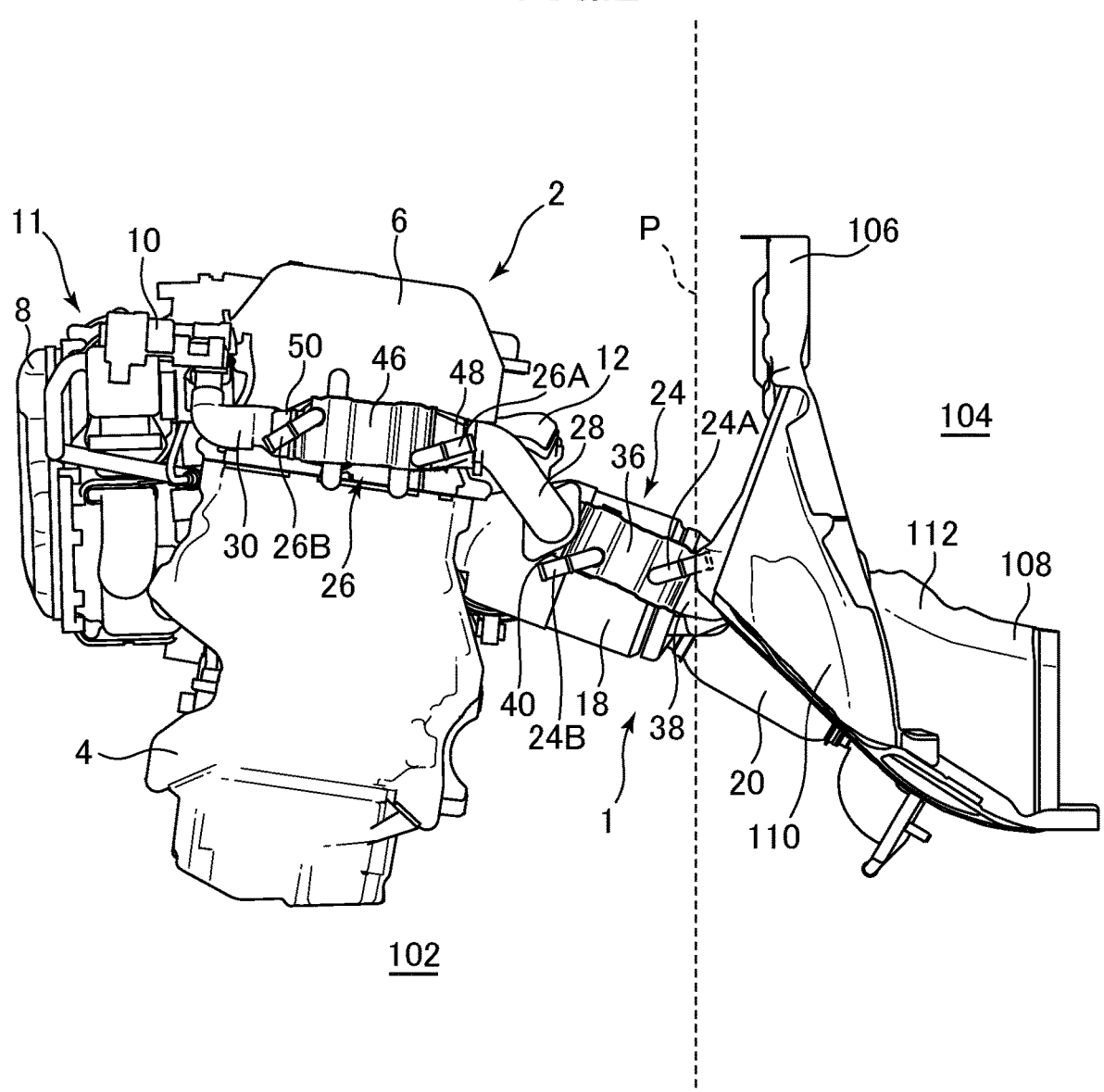
FIG. 2 is a side view of the exhaust system device for the vehicle according to the first embodiment of the present invention.
Figure 3:
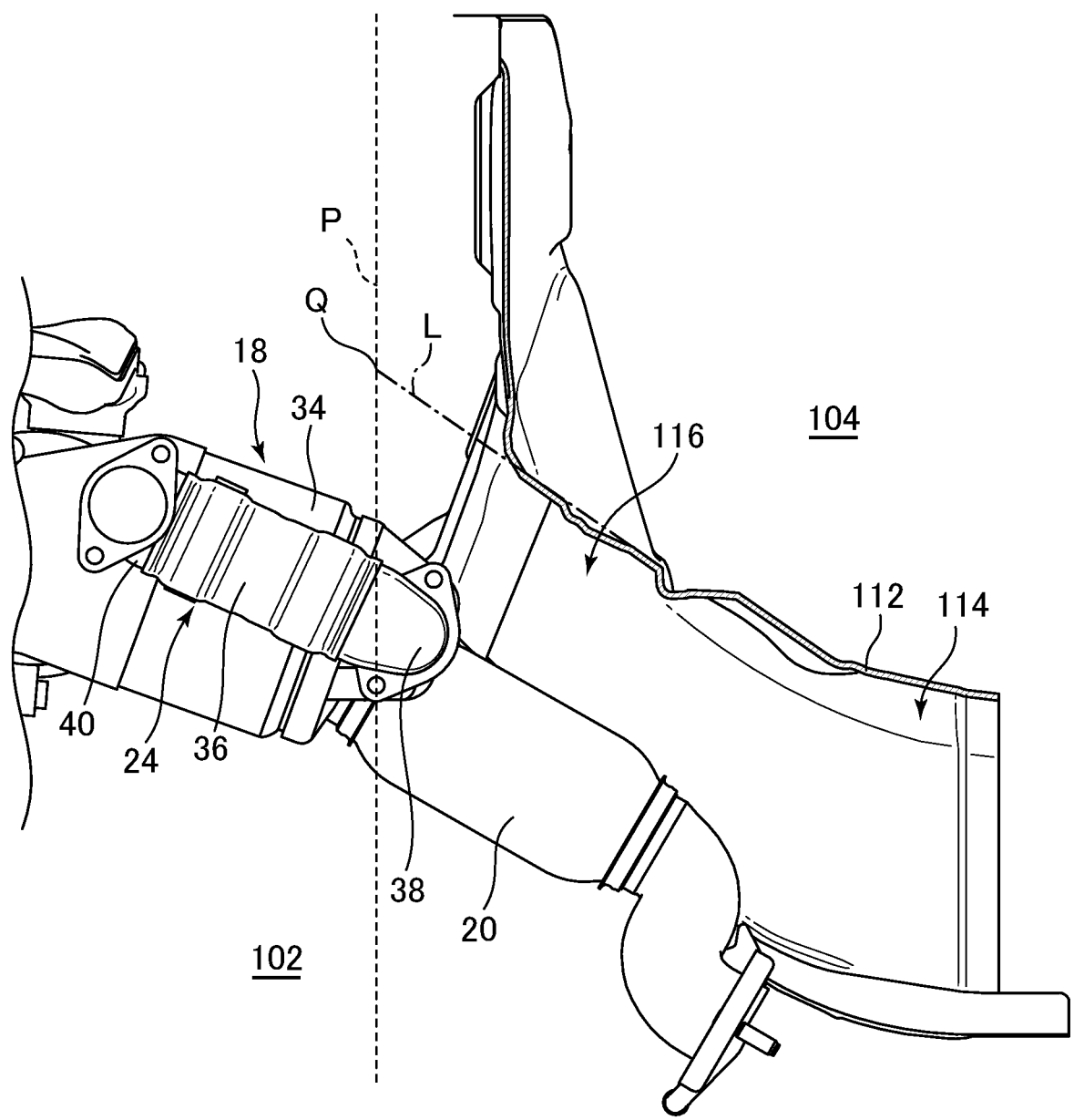
FIG. 3 is a side view of the exhaust system device for the vehicle according to the first embodiment of the present invention, with a part of the device broken.
Figure 4:
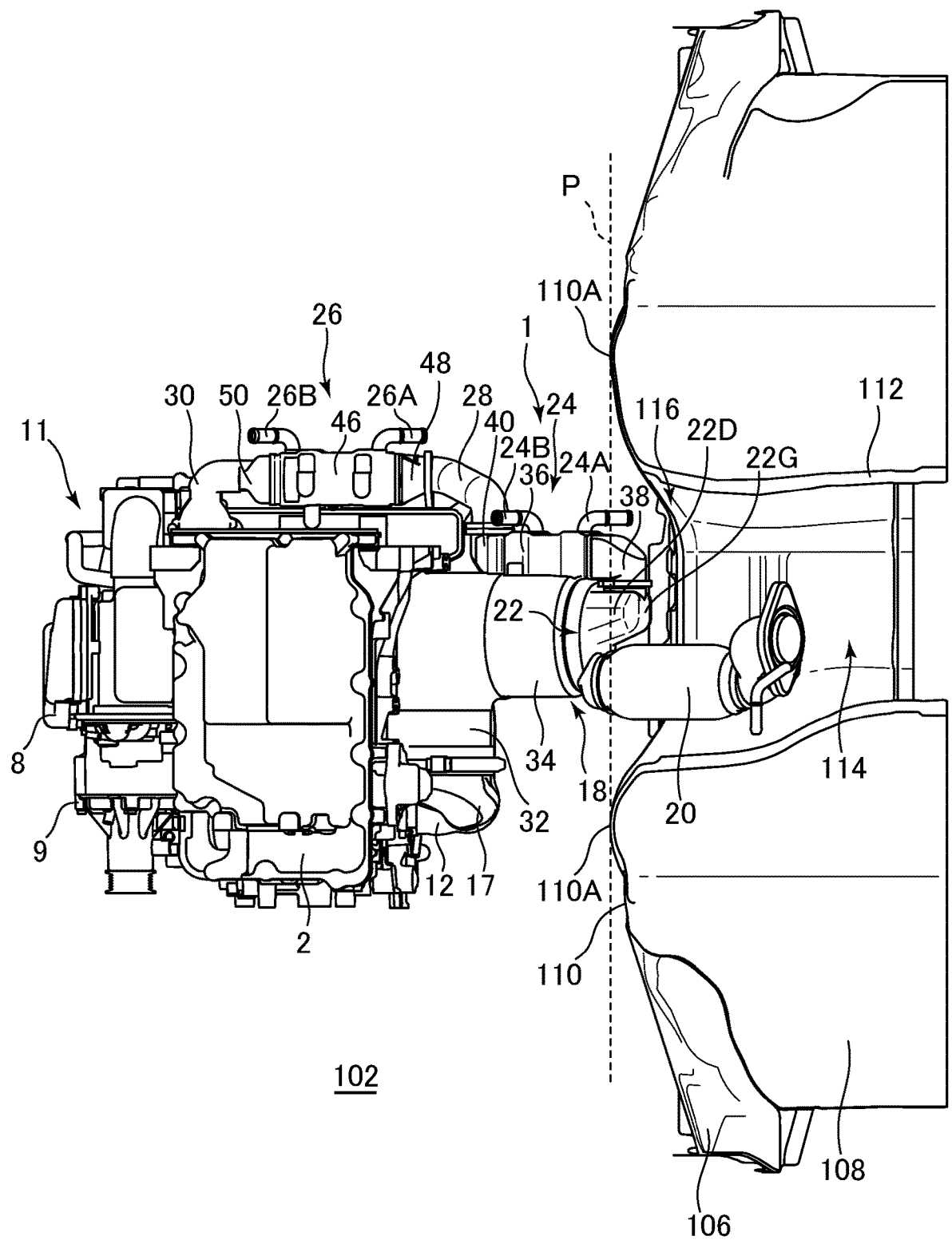
FIG. 4 is a bottom view of the exhaust system device for the vehicle according to the first embodiment of the present invention.

FIG. 1 shows a plan view of an exhaust system device 1 for a vehicle according to a first embodiment of the present invention, FIG. 2 shows a side view of the exhaust system device 1 for the vehicle according to the first embodiment of the present invention, FIG. 3 shows a side view of the exhaust system device 1 for the vehicle according to the first embodiment of the present invention, with a part of the device broken, and FIG. 4 shows a bottom view of the exhaust system device 1 for the vehicle according to the first embodiment of the present invention. FIG. 1 is a view of the exhaust system device 1 for the vehicle viewed from above, and in this figure, the horizontal direction indicates the longitudinal direction of the vehicle, the left side indicates the front direction of the vehicle, and the right side indicates the rear direction of the vehicle. Further, in this figure, the vertical direction indicates the vehicle-width direction of the vehicle, the upper side indicates the right direction of the vehicle, and the lower side indicates the left direction of the vehicle.

As shown in these FIGS. 1 to 4, the exhaust system device 1 for the vehicle according to the first embodiment of the present invention is applied to an engine 2 of a compression self-ignition system, such as a diesel engine or a homogeneous-charge compression ignition (HCCI) gasoline engine. The engine 2 includes a cylinder block 4 and a cylinder head 6 fitted to the upper portion of the cylinder block 4. In the present embodiment, inside an engine room 102, the engine 2 is disposed such that a crank shaft (not shown) is disposed along a vehicle-width direction of a vehicle 100, an intake system is disposed on the vehicle-front side of the engine 2, and an exhaust system is disposed on the vehicle-rear side of the engine 2, therefore, the engine 2 is thus a so-called front-intake rear-exhaust engine.

An intake manifold 8 integrated with a water-cooling inter cooler is fitted to the intake side of the engine 2, and a super-charger 9 is connected to the upstream side of the intake manifold 8 above the intake manifold 8, the super-charger 9 extending along the direction of the crank shaft of the engine 2, namely, along the vehicle-width direction of the vehicle 100 in the present embodiment. An EGR valve 10 is provided upstream of the supercharger 9. The EGR valve 10 is located to the left side of the center of the engine 2 in the vehicle-width direction, and more specifically, the EGR valve 10 is located at substantially the same position as the left-side side surface of the engine 2 in the vehicle-width direction. A pipe provided with the EGR valve 10, the super-charger 9, and a passage for intake which passes through the intake manifold 8 constitute an intake passage 11 in the present embodiment.

Figure 5:
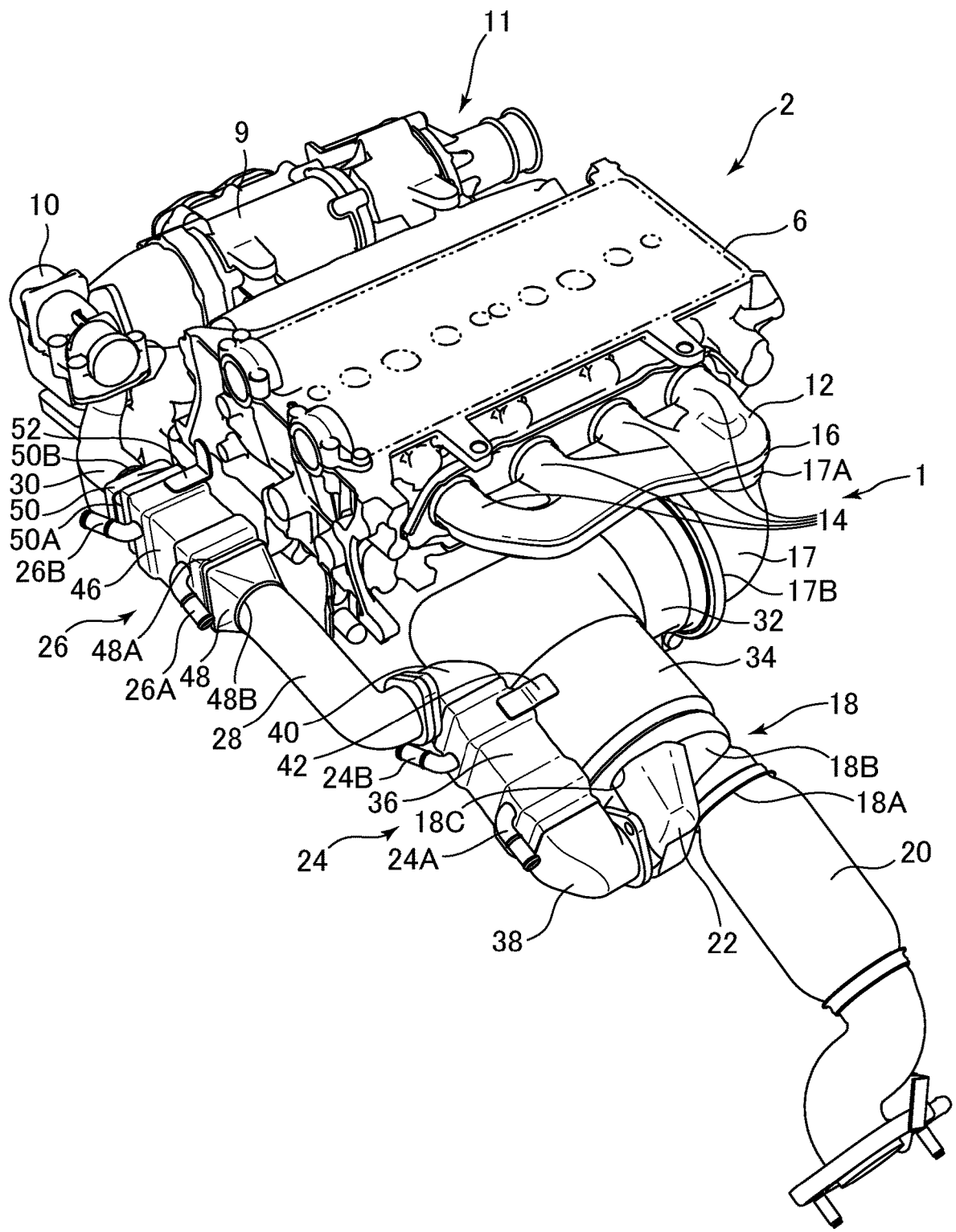
FIG. 5 is a perspective view of the exhaust system device for the vehicle according to the first embodiment of the present invention.

FIG. 5 is a perspective view of the exhaust system device for the vehicle according to the first embodiment of the present invention. As shown in this FIG. 5 and aforementioned FIGS. 1 to 4, an exhaust manifold 12 is fitted to the discharge side of the engine 2. The exhaust manifold 12 includes a plurality of discharge pipes 14 connected to exhaust ports (not shown) for respective cylinders (four cylinders in the present embodiment) of the engine 2, and a mixing tube 16 where exhaust gases passing through the discharge pipes 14 converge. The discharge pipes 14 respectively extend from the exhaust ports of the cylinder block 4 toward the rear side of the vehicle 100, extend while being bent to the right in the vehicle-width direction on the downstream thereof, and are connected to the mixing tube 16 on the right side of the exhaust manifold 12 while sequentially converging with the adjacent discharge pipes 14 on substantially the same horizontal planes. With such a structure, when the exhaust manifold 12 is viewed from above, the mixing tube 16 is disposed on the right side of the exhaust manifold 12 in the vehicle-width direction and also disposed to the right of the center of the engine 2 in the vehicle-width direction. The mixing tube 16 is open on the lower surface while vertically extending in a short distance. An exhaust system device 1 of the present embodiment is connected to the mixing tube 16 via an exhaust purification device introduction passage 17.

The exhaust purification device introduction passage 17 has a gas inlet 17A and a gas outlet 17B. The gas inlet 17A is open upward and is coupled to an opening of the mixing tube 16. The gas outlet 17B is open in a direction substantially orthogonal to the gas inlet 17A, and specifically, the gas outlet 17B is open to the left in the vehicle-width direction.

The exhaust system device 1 includes: an exhaust purification device 18 for purifying an exhaust gas received from the exhaust manifold 12; a flexible pipe 20 connected to the exhaust purification device 18 so as to discharge the exhaust gas passing through the exhaust purification device 18 to the outside; an EGR gas leading part 22 for taking out a part of the exhaust gas passing through the exhaust purification device 18 as an EGR gas; a first EGR cooler 24 and a second EGR cooler 26 connected to the EGR gas leading part 22 and for cooling the EGR gas taken out of the exhaust purification device 18; a first EGR pipe 28 coupling the first EGR cooler 24 with the second EGR cooler 26; and a second EGR pipe 30 coupling the second EGR cooler 26 with the intake passage 11.

The exhaust purification device 18 has a substantially L-shape as viewed from the above of the vehicle 100 and includes an upstream-side portion 32 connected to the mixing tube 16 of the exhaust manifold 12 and a downstream-side portion 34 provided downstream of the upstream-side portion 32 and connected to the flexible pipe 20 and the EGR gas leading part 22.

The upstream-side portion 32 is a substantially cylindrical portion coupled to the gas outlet 17B of the exhaust purification device introduction passage 17 and is disposed with its central axis (longitudinal axis) along the vehicle-width direction. Hence the outer surface of the upstream-side portion 32 is disposed adjacent to the outer surface of the cylinder block 4 of the engine 2. A catalyst device is incorporated in the upstream-side portion 32.

The downstream-side portion 34 is a substantially cylindrical portion integrally formed in the upstream-side portion 32 and is disposed with its central axis (longitudinal axis) substantially at the right angle to the central axis of the upstream-side portion 32. Further, the central axis of the downstream-side portion 34 extends in the longitudinal direction of the vehicle 100, and is disposed such that the upstream end of the downstream-side portion 34 is located above the downstream end, namely, such that the central axis is inclined downwardly from the upstream end to the downstream end of the downstream-side portion 34. A gasoline particulate filter (GPF) is incorporated in the downstream-side portion 34.

With such a structure, the upstream-side portion 32 of the exhaust purification device 18 is disposed along the vehicle-width direction below the exhaust manifold 12, and the downstream-side portion 34 is disposed along the longitudinal direction of the vehicle 100 on the left to the center of the engine 2 in the vehicle-width direction.

The flexible pipe 20 is a cylindrical member connected to an exhaust outlet 18A formed at the downstream end of the downstream-side portion 34 of the exhaust purification device 18 and is formed of a material expandable-retractable or bendable to a certain extent. The flexible pipe 20 is coupled to the exhaust outlet 18A disposed on the right side in the vehicle-width direction and the lower side in the vertical direction on the circular end surface 18B at the downstream end of the downstream-side portion 34 of the exhaust purification device 18. Further, the central axis (longitudinal axis) of the flexible pipe 20 extends in the longitudinal direction of the vehicle 100 and is disposed such that the downstream-side end is located below the upstream-side end, namely, such that the central axis is inclined downwardly from the upstream-side end to the downstream-side end, and an inclined angle of the central axis is set to be larger than an inclined angle of the downstream-side portion 34 of the exhaust purification device 18.

Figure 6:
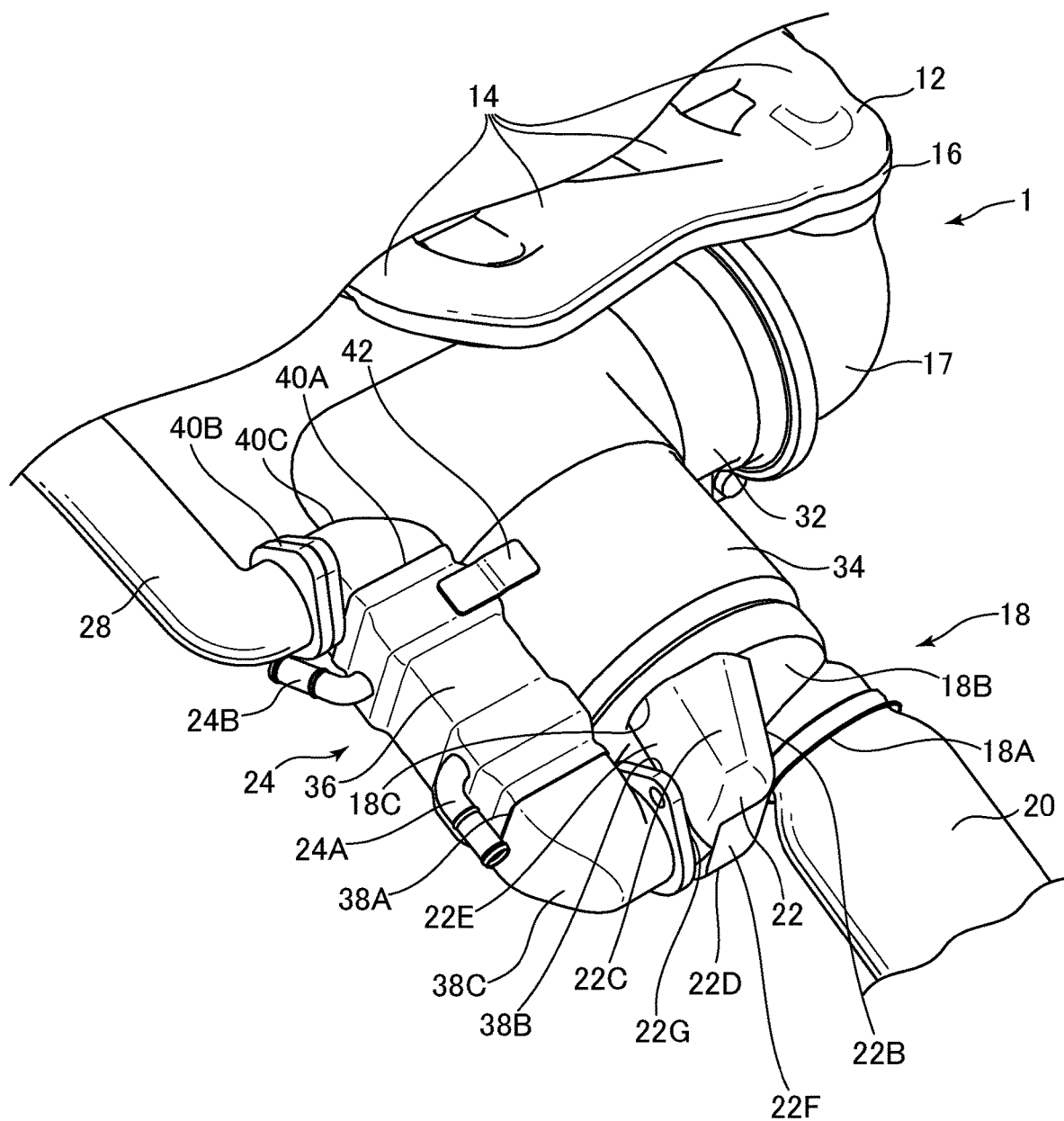
FIG. 6 is an enlarged perspective view showing a part of an exhaust system device of the vehicle according to the first embodiment of the present invention.

FIG. 6 is an enlarged perspective view showing a part of the exhaust system device for the vehicle according to the first embodiment of the present invention. As shown in this FIG. 6 and aforementioned FIGS. 1 to 5, the EGR gas leading part 22 is a tubular member coupled to an EGR gas outlet 18C formed at the downstream end of the downstream-side portion 34 of the exhaust purification device 18. The EGR gas leading part 22 is coupled to the EGR gas outlet 18C disposed at a position on the left side in the vehicle-width direction and the upper side in the vertical direction on the circular end surface 18B at the downstream end of the downstream-side portion 34. With such a placement, a connection part between the EGR gas leading part 22 and the exhaust purification device 18 is located above a connection part between the flexible pipe 20 and the exhaust purification device 18 and on the left thereto in the vehicle-width direction.

The longitudinal axis of the EGR gas leading part 22 is disposed along the longitudinal direction of the vehicle 100, namely, along a gas flow direction of an exhaust gas flowing through the downstream-side portion 34 and substantially parallel to the central axis of the downstream-side portion 34, and the upstream end 22A of the EGR gas leading part 22 is open to the surface intersecting with the axis parallel to the central axis of the downstream-side portion 34, which is the surface substantially orthogonal to the central axis of the downstream-side portion 34 in the present embodiment.

The EGR gas leading part 22 is formed in a substantially rectangular cross-section shape and tapered toward the downstream. Specifically, the EGR gas leading part 22 has a right side surface 22B, an upper surface 22C, a lower surface 22D, a left side surface 22E, and a downstream end surface 22F, the right side surface 22B is an inclined surface inclined to the left in the vehicle-width direction toward the downstream, the upper surface 22C is an inclined surface inclined downwardly toward the downstream and the lower surface 22D is an inclined surface inclined upward as going downstream. However, the left side surface 22E has a flat surface parallel to the central axis of the downstream-side portion 34. Further, the downstream end surface 22F has a flat surface substantially orthogonal to the central axis of the downstream-side portion 34 of the exhaust purification device 18.

A downstream end 22G of the EGR gas leading part 22 is formed on the left side surface 22E, and hence an outlet (downstream end 22G) of the EGR gas leading part 22 is open to the left in the vehicle-width direction. The surface of the outlet of the EGR gas leading part 22 including the opening surface, is disposed so as to be in contact with the circumference of the downstream-side portion 34.

The first EGR cooler 24 is a water-cooling type EGR cooler and includes a first EGR cooler body 36, a first EGR gas flow-in part 38 formed at one upstream end of the first EGR cooler body 36, and a first EGR gas flow-out part 40 formed at the other downstream end of the first EGR cooler body 36.

The first EGR cooler body 36 is formed in a substantially rectangular parallelepiped, a longitudinal axis of the first EGR cooler body 36 is disposed substantially parallel to the central axis of the downstream-side portion 34 of the exhaust purification device 18, and one side surface of the first EGR cooler body 36 is disposed adjacent to the circumferential surface of the downstream-side portion 34.

A bracket 42 projecting from the side surface of the first EGR cooler body 36 toward the exhaust purification device 18 is provided on the upper surface of the first EGR cooler body 36, and by fixing this bracket 42 to the side surface of the downstream-side portion 34 of the exhaust purification device 18 by bolting, welding, or the like, the outer surface of the first EGR cooler 24 is fixed to the outer surface of the exhaust purification device 18. Hence the first EGR cooler 24 and the exhaust purification device 18 are fixed and fitted to each other in a place different from where the first EGR cooler 24 is connected to the exhaust purification device 18 via the EGR gas leading part 22.

The first EGR gas flow-in part 38 is located behind the first EGR cooler body 36 in the vehicle, is formed in a tubular shape, and is coupled integrally to the first EGR cooler body 36 at one end 38A on the first EGR cooler body 36 side. The other end of the first EGR gas flow-in part 38 is open to the right in the vehicle-width direction, namely, to the surface substantially orthogonal to the vehicle-width direction, to become a first EGR gas flow inlet 38B of the first EGR cooler 24. The first EGR gas flow inlet 38B is coupled to an outlet (downstream end 22G) of the EGR gas leading part 22, whereby the first EGR cooler 24 communicates with the EGR gas leading part 22. On a left side surface 38C of the first EGR gas flow-in part 38 in the vehicle-width direction, an inclined surface is formed which is inclined to the right toward the rear of the vehicle 100, namely, inclined to the gas flow inlet 38B (EGR gas leading part 22) side as going upstream of the first EGR gas flow-in part 38.

As thus described, the upstream end 22A of the EGR gas leading part 22 is open to the direction of the exhaust purification device 18 along the longitudinal direction of the vehicle 100, the downstream end 22G of the EGR gas leading part 22 is open to the left in the vehicle-width direction, the first EGR gas flow inlet 38A of the first EGR cooler 24 is open to the right, and the one end 38A is open to the direction along the longitudinal direction of the vehicle 100, whereby the direction of the path of the EGR gas leading from the EGR gas outlet 18A of the exhaust purification device 18 to the upstream end of the first EGR cooler body 36 is changed from the rear of the vehicle 100 to the left in the vehicle-width direction at the EGR gas leading part 22 and is then changed to the front at the first EGR gas flow-in part 38, and as a whole, the direction is rotated from the rear to the front by 180°. Further, the first EGR cooler 24 is disposed on the left to the downstream-side portion 34 of the exhaust purification device 18 in the vehicle-width direction, and whereby, the first EGR cooler 24 is adjacent to the side surface of the exhaust purification device 18 on the EGR valve 10 side of the intake passage 11 with respect to the vehicle-width direction.

The first EGR gas flow-out part 40 is located in front of the first EGR cooler body 36 in the vehicle, is formed in a tubular shape, and is coupled integrally to the first EGR cooler body 36 at one end 40A on the first EGR cooler body 36 side. The other end of the first EGR gas flow-out part 40 is open to the left in the vehicle-width direction, namely, to the surface substantially orthogonal to the vehicle-width direction, to become a first EGR gas flow outlet 40B of the first EGR cooler 24. The first EGR gas flow outlet 40B is coupled to one end of the first EGR pipe 28. On a right-side surface 40C of the first EGR gas flow-out part 40 in the vehicle-width direction, an inclined surface is formed which is inclined to the left toward the front of the vehicle 100, namely, inclined to the first EGR gas flow outlet 40B (first EGR pipe 28) side as going downstream of the first EGR gas flow-out part 40.

The first EGR cooler 24 with such a structure as described above is disposed as inclined downwardly toward the upstream side, namely, inclined downwardly toward the rear of the vehicle. Hence the first EGR gas flow outlet 40B of the first EGR cooler 24 is located above the first EGR gas flow inlet 38B. The inclined angle of the first EGR cooler 24 is larger than the inclined angle of the downstream-side portion 34 of the exhaust purification device 18 and is substantially the same as the inclined angle of the flexible pipe 20.

Further, in the side view, the first EGR cooler 24 is accommodated within a vertical dimension of the downstream-side portion 34 of the exhaust purification device 18, and in the side view, the first EGR cooler 24 does not project upward or downward from the exhaust purification device 18.

The second EGR cooler 26 is a water-cooling type EGR cooler, and includes a second EGR cooler body 46, a second EGR gas flow-in part 48 formed at one end of the second EGR cooler body 46 on the upstream side, and a second EGR gas flow-out part 50 formed at the other end of the second EGR cooler body 46 on the downstream side.

The second EGR cooler body 46 is formed in a substantially rectangular parallelepiped, a longitudinal axis of the second EGR cooler body 46 is disposed along the longitudinal direction of the vehicle 100, and one side surface of the second EGR cooler body 46 is disposed adjacent to the left surface of the cylinder block 4 of the engine 2.

Further, a bracket 52 projecting upward from the upper surface of the second EGR cooler body 46 or projecting downward from the lower surface thereof is provided on each of the upper surface and the lower surface of the second EGR cooler body 46, and by fixing this bracket 52 to the left side surface of the cylinder block 4 by bolting, welding, or the like, the outer surface of the second EGR cooler 26 is fixed and fitted to the outer surface of the cylinder block 4.

The second EGR gas flow-in part 48 is located behind the second EGR cooler body 46 in the vehicle, is formed in a tubular shape, and is coupled integrally to the second EGR cooler body 46 at one end 48A on the second EGR cooler body 46 side. The other end of the second EGR gas flow-in part 48 is open to the rear of the vehicle 100, to become a second EGR gas flow inlet 48B of the second EGR cooler 26. The second EGR gas flow inlet 48B is coupled to the other end of the first EGR pipe 28.

The second EGR gas flow-out part 50 is located in front of the second EGR cooler body 46 in the vehicle, is formed in a tubular shape, and is coupled integrally to the second EGR cooler body 46 at one end 50A on the second EGR cooler body 46 side. The other end of the second EGR gas flow-out part 50 is open to the front of the vehicle 100, to become a second EGR gas flow outlet 50B of the second EGR cooler 26. The second EGR gas flow outlet 50B is coupled to one end of the second EGR pipe 30.

The second EGR cooler 26 with such a structure as described above is disposed as inclined downwardly toward the upstream side, namely, inclined downwardly toward the rear of the vehicle. Hence the second EGR gas flow inlet 48B is disposed vertically below the second EGR gas flow outlet 50B in the vehicle vertical direction. The inclined angle of the second EGR cooler 26 is smaller than the inclined angle of the downstream-side portion 34 of the exhaust purification device 18. Further, the second EGR gas flow inlet 48B is disposed above the first EGR gas flow outlet 40B of the first EGR cooler 24 and on the left thereto in the vehicle-width direction. With such a placement, the second EGR cooler 26 is located above the exhaust purification device 18 and the first EGR cooler 24 and on the left thereto in the vehicle-width direction.

Note that the first EGR cooler 24 and the second EGR cooler 26 are the water-cooling types and are thus provided with cooling water inlets 24A, 26A and cooling water outlets 24B, 26B, respectively. The cooling water outlet 24B of the first EGR cooler 24 communicates with the cooling water inlet 26A of the second EGR cooler 26, and hence cooling-water circuits of the first EGR cooler 24 and the second EGR cooler 26 are coupled in series. Cooling water passing through the first EGR cooler 24 and the second EGR cooler 26 and come out of the cooling water outlet 26B cools each part of the engines, such as the cylinder head and the cylinder block wall surface, while being cooled by a radiator as needed, and returns to the cooling-water inlet 24A of the first EGR cooler 24.

The first EGR pipe 28 is a tubular member communicating the first EGR gas flow-out part 40 of the first EGR cooler 24 with the second EGR gas flow-in part 48 of the second EGR cooler 26 and is formed of a rubber hose in the present embodiment. The first EGR pipe 28 is coupled to the first EGR gas flow-out part 40 along the vehicle-width direction, extends while being bent upward and to the front of the vehicle 100, and is coupled to the second EGR gas flow-in part 48 along the direction to the front of the vehicle 100.

The second EGR pipe 30 is a tubular member communicating the second EGR gas flow-out part 50 of the second EGR cooler 26 with the intake passage 11. The second EGR pipe 30 extends along the direction to the front of the vehicle 100, extends while being bent upward on the lower side of the intake passage 11, and is coupled to the EGR valve 10 from below.

Here, the placement of the exhaust system device 1 with respect to the vehicle 100 will be described.

As shown in FIGS. 2 to 4, the engine 2 and the exhaust system device 1 are disposed in the engine room 102 of the vehicle 100, and a vehicle interior 104 is formed behind the engine room 102. The engine room 102 and the vehicle interior 104 are partitioned by a dash panel 106. The dash panel 106 includes a lower dash panel 108 disposed in a lower part of the vehicle interior 104, and an upper lower dash panel 110 coupled to the front end of the lower dash panel 108 and extending to the front part of the vehicle interior 104 in the vehicle-width direction.

A floor tunnel 112 extending in the longitudinal direction of the vehicle 100 and projecting to the vehicle interior 104 side is formed in the lower dash panel 108 and the upper lower dash panel 110. A floor tunnel region 114 is a lower-side region of the floor tunnel 112, is surrounded by a projecting portion of the floor tunnel 112 and open downward, and includes in its front-end portion a tunnel extension region 116 having cross-sectional area which increases toward the front of the vehicle 100. In the tunnel extension region 116, as shown in FIGS. 1 and 4, the width of the floor tunnel region 114 in the vehicle-width direction gradually increases as viewed from the vertical direction of the vehicle 100, and this increase in the width stops at a front end 110A projecting to the frontmost end side of the upper lower dash panel 110 on each side of the floor tunnel region 114 in the vehicle-width direction. Therefore, in the present embodiment, the front end of the tunnel extension region 116 is located on a vertical plane P passing through the front end 110A of the upper lower dash panel 110. As thus described, the tunnel extension region 116 means a region to a position where the width of the floor tunnel region 114 in the vehicle-width direction stops increasing, and the floor tunnel region 114 includes the tunnel extension region 116.

Moreover, as shown in FIGS. 2 and 3, in the side view of the vehicle 100, the upper surface and the lower surface of the floor tunnel region 114 are inclined upwardly toward the front. FIGS. 2 and 3 also show the plane P being the front end of the tunnel extension region 116. In the side view of the vehicle 100, a position Q where the plane P at the front end of the tunnel extension region 116 intersects with a line L extending from the upper end of the floor tunnel 112 is the upper end of the tunnel extension region 116. Further, as viewed from the front of the vehicle 100, the border of the tunnel extension region 116 in the vehicle-width direction is located at the front end 110A of the upper lower dash panel 110.

In the exhaust system device 1 for the vehicle of the present embodiment, the center of the engine 2 in the width direction is located to the right of the center of the floor tunnel region 114 in the width direction. The exhaust purification device 18, the flexible pipe 20, the EGR gas leading part 22, the first EGR cooler 24, and the second EGR cooler 26 are disposed at positions overlapping the floor tunnel region 114, as viewed from the front of the vehicle 100. The exhaust purification device 18, a part of the flexible pipe 20, the EGR gas leading part 22, and the first EGR cooler 24 are also disposed at positions overlapping a region other than the tunnel extension region 116 in the floor tunnel region 114, as viewed from the front of the vehicle 100.

Moreover, as shown in FIGS. 1 to 4, the vehicle-rear-side portions of the exhaust purification device 18 and the first EGR cooler 24 are disposed within the floor tunnel region 114. More specifically, a part of the downstream-side end of the exhaust purification device 18, most of the EGR gas leading part 22, most of the first EGR gas flow-in part 38 of the first EGR cooler 24, and most of the flexible pipe 20 are disposed within the tunnel extension region 116 which is the vehicle-front-side end of the floor tunnel region 114. Therefore, the downstream-side end of the exhaust purification device 18, the EGR gas leading part 22, the first EGR gas flow-in part 38, and the flexible pipe 20 are disposed so as to overlap the floor tunnel region 114 as viewed from the vertical direction and the lateral side of the vehicle 100.

The exhaust system device 1 for the vehicle with such a structure acts as follows.

First, an exhaust gas discharged from the engine 2 passes through the discharge pipe 14 of the exhaust manifold 12, merges into the mixing tube 16, flows downward, and flows into the exhaust purification device introduction passage 17. The exhaust gas flown into the exhaust purification device introduction passage 17 changes its direction from the below to the left in the vehicle-width direction and enters the exhaust purification device 18. In the exhaust purification device 18, the exhaust gas passes to the left through the catalyst device of the upstream-side portion 32, passes to the rear of the vehicle 100 through the GPF of the downstream-side portion 34, and is purified. A part of the exhaust gas after the passage through the downstream-side portion 34 comes out of the exhaust outlet 18A, passes through the flexible pipe 20, and is then discharged out of the vehicle through a muffler or the like (not shown).

Meanwhile, the remaining part of the exhaust gas after the passage through the downstream-side portion 34 flows as the EGR gas from the EGR gas outlet 18C into the EGR gas leading part 22 toward the rear of the vehicle 100. The EGR gas changes the gas flow direction to the left in the vehicle-width direction while being guided to the right side surface 22B, the upper surface 22C, and the lower surface 22D of the EGR gas leading part 22, and changes the gas flow direction to the front while being guided to the left side surface 38C of the first EGR gas flow-in part 38 of the first EGR cooler 24, to rotate the gas flow direction by 180°.

The EGR gas flowing toward the front of the vehicle 100 enters the first EGR cooler body 36 from the first EGR gas flow-in part 38 to be cooled and comes out of the first EGR gas flow-out part 40 into first EGR pipe 28 while changing the gas flow to the left in the vehicle-width direction. The EGR gas passing through the first EGR pipe 28 flows into the second EGR cooler 26 toward the front of the vehicle 100, is further cooled by the second EGR cooler 26, enters the second EGR pipe 30 from the second EGR cooler 26 toward the front of the vehicle 100, and flows into the intake passage 11 via the EGR valve 10.

The exhaust system device 1 for the vehicle with such a structure achieves effects as described below.

The first EGR cooler 24 is adjacent to the exhaust purification device 18 and the outer surface of the first EGR cooler 24 is fitted and fixed to the outer surface of the downstream-side portion 34 of the exhaust purification device 18 with the bracket 42, thereby eliminating the need to fit the first EGR cooler 24 to the cylinder block 6 of the engine 4 as in the conventional case. It is thus possible to enhance the flexibility in placement of the first EGR cooler 24. Since the first EGR cooler 24 is adjacent to the exhaust purification device 18 and the outer surface of the first EGR cooler 24 is fixed to the outer surface of the downstream-side portion 34 of the exhaust purification device 18 with the bracket 42, the first EGR cooler 24 and the exhaust purification device 18 operate as one rigid body, which can suppress generation of resonance between the first EGR cooler 24 and the exhaust purification device 18.

Further, with the first EGR cooler 24 being adapted to introduce exhaust from the downstream side of the exhaust purification device 18, the exhaust with a deposit reduced by the exhaust purification device 18 can be introduced into the first EGR cooler 24. Moreover, the central axis of the downstream-side end of the exhaust purification device 18 is inclined downwardly toward the rear side of the vehicle 100, and the first EGR cooler 24 is disposed such that the central axis of the first EGR cooler 24 is inclined downwardly toward the rear side of the vehicle 100, therefore, it is possible to prevent accumulation of condensed water, which may be generated in the first EGR cooler 24, in the first EGR cooler 24 and the counter flow thereof to the exhaust purification device 18, and to smoothly discharge the condensed water to the flexible pipe 20.

The EGR gas leading part 22 is disposed behind the downstream-side portion 34 of the exhaust purification device 18 in the vehicle 100 and is disposed on the downstream side of the gas flow direction of the exhaust gas in the downstream-side portion 34, therefore, the exhaust gas flowing through the downstream-side portion 34 flows into the EGR gas leading part 22 without changing its direction. This can facilitate taking the EGR gas out of the exhaust purification device 18. Therefore, for example, when the engine 2 is being operated in a low-revolution low-load range, the flow rate of the exhaust gas becomes small, but even in such a case, a required flow rate of the exhaust gas can be ensured.

Since the EGR gas leading part 22 is disposed downstream of the exhaust purification device 18, it is possible to take an exhaust gas passing through the exhaust purification device 18 and thus in an even lower temperature state as the EGR gas, therefore, it is thereby possible to supply the EGR gas with an even lower temperature to the engine 2.

Since the second EGR gas flow outlet 50B of the second EGR cooler 26 is located above the second EGR gas flow inlet 48B, when condensed water is generated in the second EGR cooler 26, the condensed water flows upstream from the second EGR gas flow outlet 50B side to the second EGR gas flow inlet 48B side. Further, since the second EGR gas flow inlet 48B is located above the first EGR gas flow outlet 40B of the first EGR cooler 24, the condensed water flows upstream to the first EGR cooler 24.

Moreover, since the first EGR gas flow inlet 38B of the first EGR cooler 24 is located below the first EGR gas flow outlet 40B, the condensed water flowing from the second EGR cooler 26 and condensed water generated in the first EGR cooler 24 flow upstream from the first EGR gas flow outlet 40B side to the first EGR gas flow inlet 38B side. Since the first EGR gas flow inlet 38B is located above the exhaust outlet 18A of the exhaust purification device 18, the condensed water flows toward the exhaust outlet 18A of the exhaust purification device 18. As the exhaust outlet 18A is connected to the flexible pipe 20, the condensed water is discharged to the outside through the flexible pipe 20.

With such a structure as described above, the condensed water generated in the first EGR cooler 24 and the second EGR cooler 26 can be discharged to the outside, thereby preventing suction of the condensed water to the engine 2 side. Hence it is possible to prevent water hammer which may occur due to suction of condensed water. In addition, it is possible to prevent accumulation of condensed water in the first EGR cooler 24, the second EGR cooler 26, and the first and second EGR pipes 28, 30, and to prevent corrosion of these parts.

With respect to the exhaust purification device 18 disposed on the rear of the engine 2, the first EGR cooler 24 is disposed adjacent to the left-side side surface of the exhaust purification device 18 in the vehicle-width direction, the first EGR pipe 28, the second EGR cooler 26, and the second EGR pipe 30 are disposed along the left-side side surface of the engine 2 in the vehicle-width direction, and the second EGR gas passage 30 communicates with the intake passage 11 at the position of the EGR valve 10 on the front left side of the engine 2. Therefore, the EGR gas path leading from the exhaust purification device 18 to the intake passage 11 through the first and second EGR coolers 24, 26 can be disposed on the left side of the engine 2 in the vehicle-width direction where the EGR valve 10 is disposed. It is therefore possible to make the EGR gas path short and the response of the EGR control favorable. Especially in the present embodiment, since the longitudinal axial line of the downstream-side portion 34 of the exhaust purification device 18 is disposed on the left to the engine 2 in the vehicle-width direction, by disposing the EGR gas path which includes the first EGR cooler 24 and the second EGR cooler 26 along the left side of the engine 2 in the vehicle-width direction, the EGR gas path can be made even shorter.

Since the rear side ends of the exhaust purification device 18 and the first EGR cooler 24 overlap the floor tunnel region 114 as viewed from below and the side of the vehicle 100, even when the engine 2 and parts connected thereto move rearward at the time of collision of the vehicle 100, the exhaust purification device 18 and the first EGR cooler 24 are accommodated in the floor tunnel region 144. It is therefore possible to ensure the safety of vehicle passengers at the time of collision of the vehicle 100 and to prevent damage on the exhaust purification device 18 and the first EGR cooler 24. Further, with this placement, it is possible to dispose the exhaust purification device 18 and the first EGR cooler 24 such that the longitudinal axial line follows the longitudinal direction of the vehicle 100 on the rear of the engine 2, while ensuring the safety of the vehicle passengers. Thus, the exhaust purification device 18 and the first EGR cooler 24 can also be disposed along the longitudinal direction as well as being disposed along the vehicle-width direction, thereby enhancing the flexibility in the placement direction of the exhaust purification device 18 and the first EGR cooler 24.

With the second EGR cooler 26 being provided downstream of the first EGR cooler 24, it is possible to ensure the required cooling capacity while suppressing increases in size of the first EGR cooler 24 and the second EGR cooler 26. Since the increase in size of the first EGR cooler 24 can be suppressed, it is possible to suppress the resonance between the first EGR cooler 24 and the exhaust purification device 18 to which the first EGR cooler 24 is fitted.

Since the first EGR pipe 28 is made up of the rubber hose, the vibrations of the first EGR cooler 24 and the second EGR cooler 26 can be absorbed. This enables suppression of the resonance between the first EGR cooler 24 and the second EGR cooler 26.

Second Embodiment

Next, a second embodiment of the present invention will be described. In the second embodiment, the turbo supercharger 62 is disposed behind the engine 2, and the EGR gas path leading from the exhaust purification device 18 to the intake passage is different as compared to that in the first embodiment.

Figure 7:
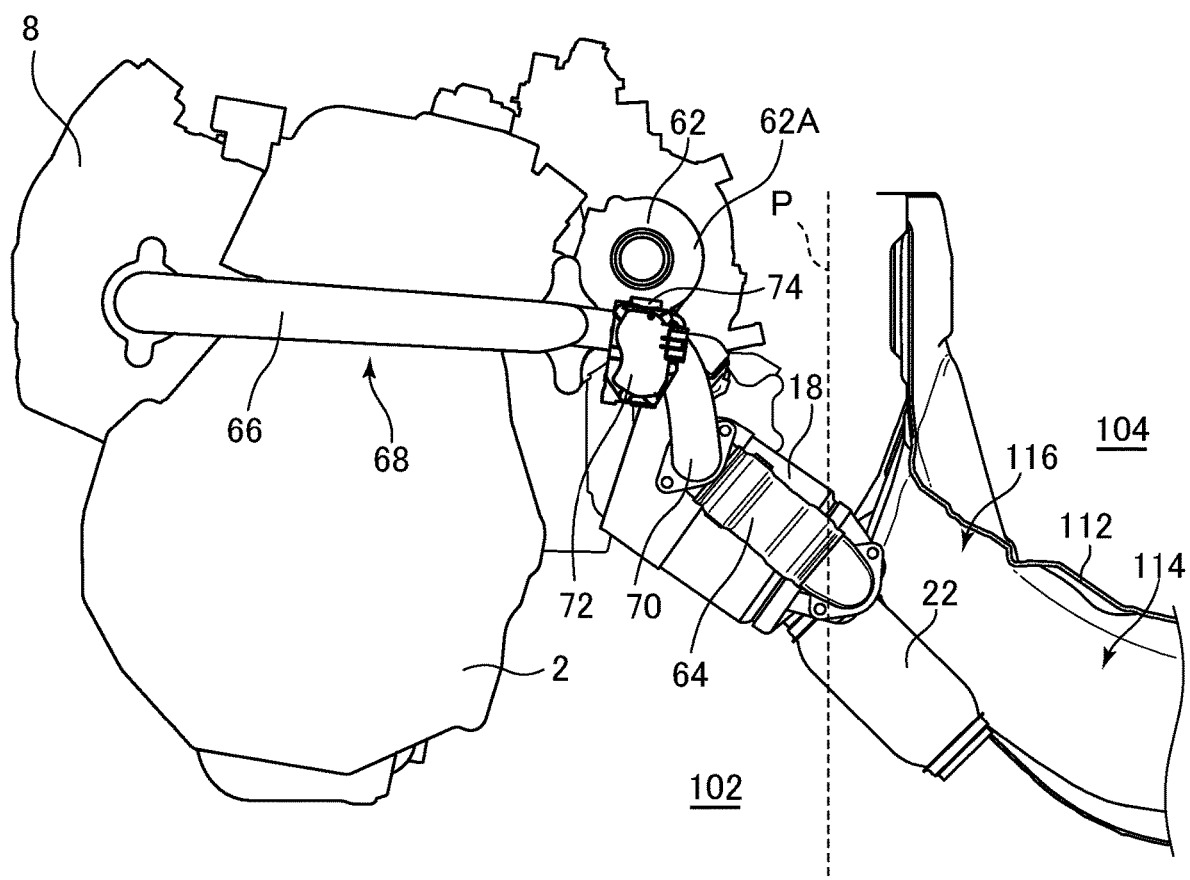
FIG. 7 is a side view of an exhaust system device for a vehicle according to a second embodiment of the present invention.

FIG. 7 is a side view of an exhaust system device 60 for a vehicle according to a second embodiment of the present invention. As shown in this FIG. 7, the turbo supercharger 62 is disposed behind the engine 2 and to the left of the center of the engine 2 in the vehicle-width direction. The turbo supercharger 62 includes a turbine (not shown) disposed on the right side and a compressor 62A disposed on the left side. The turbine is connected to the exhaust manifold 12, and the compressor 62A includes a compressor downstream passage 66 on the downstream side. The compressor downstream passage 66 has one end connected to the compressor 62A of the turbo supercharger 62, extends to the left end of the engine 2 in the vehicle-width direction along the vehicle-width direction behind the engine 2, extends so as to be inclined downwardly toward the front side along the left-side side surface of the engine 2 in the vehicle-width direction, and is connected to the intake manifold 8 on the front side of the engine 2. In the present embodiment, the passage of the intake gas from the compressor 62A of the turbo supercharger 62 to the intake manifold 8 through the compressor downstream passage 66 is an intake passage 68.

The exhaust purification device 18 is connected to the downstream side of the turbine. The upstream-side end (exhaust gas inlet) of the exhaust purification device 18 is disposed below the exhaust outlet of the turbo supercharger 62. The EGR gas leading part 22 and an EGR cooler 64 are connected to the downstream side of the exhaust purification device 18.

The structure of the EGR cooler 64 is the same as that of the first EGR cooler 24 of the first embodiment, and hence its description will be omitted here. The EGR cooler 64 is adjacent to the left side of the exhaust purification device 18 in the vehicle-width direction and has the outer surface fitted to the outer surface of the exhaust purification device 18 with a bracket (not shown) as in the first embodiment. The exhaust purification device 18 and the EGR cooler 64 are inclined downwardly toward the rear of the vehicle 100 as in the first embodiment.

One end of an EGR cooler downstream passage 70 is connected to an EGR gas flow outlet 64A which is the downstream-side end of the EGR cooler 64. The EGR cooler downstream passage 70 extends so as to be inclined rearwardly along the longitudinal direction of the vehicle 100 on the left sides of the exhaust purification device 18 and the turbo supercharger 64 in the vehicle-width direction. The other end of the EGR cooler downstream passage 70 is connected to a portion of the compressor downstream passage 66 which extends in the vehicle-width direction behind the engine 2. An EGR valve 72 is provided in the middle of the EGR cooler downstream passage 70, and the EGR valve 72 is fixed to the turbo supercharger 62 with a bracket 74.

In an exhaust system device 60 with such a structure as in the first embodiment, a part of the exhaust gas coming out of the exhaust purification device 18 is taken out as the EGR gas by the EGR gas leading part 22 and cooled by the EGR cooler 64, and thereafter, the EGR gas is supplied to the compressor downstream passage 66 of the intake passage 68 through the EGR cooler downstream passage 70.

The exhaust system device 60 of the second embodiment with such a structure as above achieves effects as follows other than similar effects to those in the first embodiment.

In the structure where the turbo supercharger 62 is provided behind the engine 2 and the compressor downstream passage 66 is provided on the left side of the turbo supercharger 62 in the vehicle-width direction, the EGR cooler 64 is fitted to the left-side side surface of exhaust purification device 18 in the vehicle-width direction while being adjacent thereto, and the EGR cooler downstream passage 70 is also disposed on the left side of the exhaust purification device 18 in the vehicle-width direction. The EGR cooler downstream passage 70 is then connected to the portion of the compressor downstream passage 66 which extends along the vehicle-width direction behind the engine 2. With such a structure, both the EGR cooler 64 and the EGR cooler downstream passage 70 are provided on the left side of the turbo supercharger 62 in the vehicle-width direction where the compressor downstream passage 66 is provided, namely, on the left side of the exhaust purification device 18 in the vehicle-width direction, therefore, the EGR gas path leading from the exhaust purification device 18 to the compressor downstream passage 66 can be made short and the response of the EGR control can be made favorable.

The present invention is not limited to the above embodiments and may, for example, be in such a form as follows.

The longitudinal axial line of the first EGR cooler 24 or the EGR cooler 64 may be substantially parallel to the central axis of the downstream-side portion 34 of the exhaust purification device. For example, in the side view of the vehicle, the longitudinal axis of the EGR cooler and the central axis of the downstream-side end of the exhaust purification device may not necessarily match or be parallel to each other but may intersect with each other. In short, the longitudinal axial line of the EGR cooler may be disposed along the longitudinal direction of the vehicle.

In the above embodiments, both the first EGR cooler 24 and the second EGR cooler 26 are of the water-cooling types, but this is not restrictive, and when two EGR coolers are provided in series, the upstream-side EGR cooler may be of an air-cooling type while the downstream-side EGR cooler may be of a water-cooling type. Employing the air-cooling type as the EGR cooler enables prevention of the increase in size of the EGR cooler as compared to the water-cooling type. Further, the EGR gas can be roughly cooled by the upstream-side air-cooling type EGR cooler and can then be reliably cooled down to a desired temperature by the downstream-side water-cooling type EGR cooler, thus enabling efficient cooling of the EGR gas.

Moreover, in the above embodiments, the cooling-water circuits of the first EGR cooler 24 and the second EGR cooler 26 are coupled in series, but this is not restrictive, and each of the first EGR cooler and the second EGR cooler may be provided on a different cooling-water circuit so as to have different cooling performance.

LIST OF REFERENCE NUMERALS 1, 60 exhaust system device
2 engine
11 intake passage
18 exhaust purification device
22 EGR gas leading part
24 first EGR cooler
26 second EGR cooler
28 first EGR pipe
30 second EGR pipe
32 upstream-side portion
34 downstream-side portion
100 vehicle

The invention claimed is:

1. An exhaust system device for a vehicle comprising:
an exhaust purifier; and
an exhaust gas recirculation (EGR) cooler,
wherein
the exhaust purifier is disposed with a central axis of a downstream-side end inclined downwardly toward a rear side of the vehicle,
the EGR cooler is provided so as to introduce exhaust from a downstream side of the exhaust purifier to an intake passage provided on a side of an engine opposite to a side of the engine on which the exhaust purifier s provided, is adjacent to the exhaust purifier and fixed to the exhaust purifier, and is disposed such that a central axis of the EGR cooler is inclined downwardly toward the rear side of the vehicle, and
the EGR cooler is adjacent to the exhaust purifier on one side of the engine in the vehicle-width direction, and a pipe connecting the EGR cooler and the intake passage extends along a side surface of the engine on the one side of the engine in the vehicle-width direction, and is connected to the intake passage on the one side of the engine in the vehicle-width direction and on the side of the engine opposite to the side of the engine where the exhaust purifier of the engine is provided.

2. The exhaust system device for the vehicle according to claim 1, wherein an EGR gas leading part for taking an EGR gas out of the exhaust purifier is disposed along a gas flow direction of the downstream-side end of the exhaust purifier.

3. The exhaust system device for the vehicle according to claim 1, wherein
an EGR gas inlet of the EGR cooler is disposed below an EGR gas outlet in a vertical direction of the vehicle, and
the EGR gas inlet is disposed above an exhaust outlet of the exhaust purifier in the vertical direction of the vehicle.

4. The exhaust system device for the vehicle according to claim 1, wherein
the exhaust purifier is disposed on a vehicle rear side of the engine, and
at least vehicle rear side ends of the exhaust purifier and the EGR cooler are disposed so as to overlap a floor tunnel region of a dash panel that partitions an engine room and a vehicle interior space as viewed from below or beside the vehicle.

5. The exhaust system device for the vehicle of claim 1, wherein a second EGR cooler is provided downstream of the EGR cooler.

6. The exhaust system device for the vehicle according to claim 5, wherein at least a part of a pipe coupling the EGR cooler and the second EGR cooler is made of a rubber hose.

7. The exhaust system device for the vehicle according to claim 5, wherein the EGR cooler is an air-cooling EGR cooler and the second EGR cooler is a water-cooling EGR cooler.

8. An exhaust system device for a vehicle, comprising:
an exhaust purifier; and
an exhaust gas recirculation (EGR) cooler,
wherein
the exhaust purifier s disposed with a central axis of a downstream side end inclined downwardly toward a rear side of the vehicle,
the EGR cooler k provided so as to introduce exhaust from a downstream side of the exhaust purifier, is adjacent to the exhaust purifier and fixed to the exhaust purifier, and is disposed such that a central axis of the EGR cooler is inclined downwardly toward the rear side of the vehicle,
a turbo supercharger and the exhaust purifier are provided on a side of an engine having a compressor downstream passage provided downstream of the turbo supercharger and on one side of the turbo supercharger in a vehicle-width direction, the EGR cooler is adjacent to the exhaust purifier on the one side of the turbo supercharger in the vehicle-width direction, and
a pipe connecting the EGR cooler and the compressor downstream passage is connected to the compressor downstream passage on a side of the engine where the exhaust purifier is provided and on the one side of the turbo supercharger in the vehicle-width direction.

9. The exhaust system device for the vehicle according to claim 8, wherein an EGR gas leading part for taking an EGR gas out of the exhaust purifier is disposed along a gas flow direction of the downstream-side end of the exhaust purifier.

10. The exhaust system device for the vehicle according to claim 8, wherein
an EGR gas inlet of the EGR cooler is disposed below an EGR gas outlet in a vertical direction of the vehicle, and
the EGR gas inlet is disposed above an exhaust outlet of the exhaust purifier in the vertical direction of the vehicle.

11. The exhaust system device for the vehicle according to claim 8, wherein,
the EGR cooler is provided so as to introduce exhaust from the downstream side of the exhaust purifier to an intake passage provided on a side of an engine opposite to the side of the engine on which the exhaust purifier is provided, and
the EGR cooler is adjacent to the exhaust purifier on one side of the engine in the vehicle-width direction, and a pipe connecting the EGR cooler and the intake passage extends along a side surface of the engine on the one side of the engine in the vehicle-width direction, and is connected to the intake passage on the one side of the engine in the vehicle-width direction and on the side of the engine opposite to the side of the engine where the exhaust purifier of the engine is provided.

12. The exhaust system device for the vehicle according to claim 8, wherein
the exhaust purifier is disposed on a vehicle rear side of the engine, and
at least vehicle rear side ends of the exhaust purifier and the EGR cooler are disposed so as to overlap a floor tunnel region of a dash panel that partitions an engine room and a vehicle interior space as viewed from below or beside the vehicle.

13. The exhaust system device for the vehicle of claim 8, wherein a second EGR cooler is provided downstream of the EGR cooler.

14. The exhaust system device for the vehicle according to claim 13, wherein at least a part of a pipe coupling the EGR cooler and the second EGR cooler is made of a rubber hose.

15. The exhaust system device for the vehicle according to claim 13, wherein the EGR cooler is an air-cooling EGR cooler and the second EGR cooler is a water-cooling EGR cooler.

* * * * *